(12) United States Patent
Paskaris et al.

(10) Patent No.: US 11,022,442 B1
(45) Date of Patent: Jun. 1, 2021

(54) SPACE GRAPH SYSTEMS AND METHODS FOR INDOOR MAPPING

(71) Applicant: MappedIn Inc., Kitchener (CA)

(72) Inventors: Patrick Paskaris, Kitchener (CA); Erkang Wei, Waterloo (CA); James Nathan Swidersky, Kitchener (CA); Sarah Knight, Kitchener (CA); Mitchell Butler, Kitchener (CA)

(73) Assignee: MappedIn Inc., Waterloo (CA)

( * ) Notice: Subject to any disclaimer, the term of this patent is extended or adjusted under 35 U.S.C. 154(b) by 168 days.

(21) Appl. No.: 15/922,229

(22) Filed: Mar. 15, 2018

Related U.S. Application Data

(60) Provisional application No. 62/471,646, filed on Mar. 15, 2017.

(51) Int. Cl.
*G01C 21/20* (2006.01)
*H04W 4/02* (2018.01)
*H04W 4/021* (2018.01)

(52) U.S. Cl.
CPC .......... *G01C 21/206* (2013.01); *H04W 4/021* (2013.01); *H04W 4/025* (2013.01)

(58) Field of Classification Search
CPC .................................................. G01C 21/206
See application file for complete search history.

(56) References Cited

U.S. PATENT DOCUMENTS

| | | | | |
|---|---|---|---|---|
| 9,574,883 | B2* | 2/2017 | Watts | G01C 21/206 |
| 2010/0021013 | A1* | 1/2010 | Gale | G01C 21/20 |
| | | | | 382/113 |
| 2010/0023252 | A1* | 1/2010 | Mays | G01C 21/3423 |
| | | | | 701/533 |
| 2011/0081919 | A1* | 4/2011 | Das | H04W 4/021 |
| | | | | 455/456.1 |
| 2011/0251787 | A1* | 10/2011 | Gupta | G01C 21/20 |
| | | | | 701/533 |
| 2014/0128093 | A1* | 5/2014 | Das | H04W 64/006 |
| | | | | 455/456.1 |

* cited by examiner

*Primary Examiner* — Anshul Sood
(74) *Attorney, Agent, or Firm* — Own Innovation; James W. Hinton

(57) ABSTRACT

Methods, devices, and systems for indoor mapping are described herein. The methods include providing an indoor map containing a current location of a user device, the indoor map having a containing exterior space, a contained interior space within the containing exterior space, and a linkage, the linkage having a coordinate transformation to project coordinates of the interior space onto coordinates of the exterior space. The methods also include receiving a point of interest, determining a path from the current location to the point of interest, the current location and the point of interest being in walkable areas, the path including a transition between the interior space and the exterior space, and providing instructions to navigate along the path, the coordinates of the interior space and the coordinates of the exterior space are referenced by either the instructions prior to the transition and the instructions after the transition.

19 Claims, 7 Drawing Sheets

US 11,022,442 B1

SPACE GRAPH SYSTEMS AND METHODS FOR INDOOR MAPPING

RELATED APPLICATIONS

This application claims the benefit of U.S. Provisional Patent Application Ser. No. 62/471,646, filed Mar. 15, 2017 entitled, "SPACE GRAPH SYSTEMS AND METHODS FOR INDOOR MAPPING", the entire contents of which are hereby incorporated by reference herein for all purposes.

TECHNICAL FIELD

The embodiments disclosed herein relates to indoor maps, and, in particular to systems, devices, and methods for generating indoor navigation.

BACKGROUND

Recent advancements in technology have transformed the ways in which people orient themselves and navigate from place to place, i.e., wayfinding. For instance, technologies such as global positioning system (GPS) enabled devices and map applications have made outdoor wayfinding more convenient and accurate.

However, less advancement has been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

SUMMARY

According a broad aspect, a method of providing navigation instructions within an indoor facility is described herein. The method involves providing a first portion of an indoor map of the indoor facility containing a current location of a user device. The indoor map has a containing exterior space, a contained interior space within the containing exterior space, and a linkage. The linkage has a reference to the containing exterior space, a reference to the contained interior space, and a coordinate transformation to project coordinates of the contained interior space onto coordinates of the containing exterior space. The method also involves receiving, at the user device, a point of interest in the indoor map; determining a path from a current location to the point of interest; and providing instructions to navigate the user device along the path from the current location to the point of interest. The current location and the point of interest are in walkable areas. One of the current location and the point of interest corresponds to the contained interior space. The path includes a transition between the contained interior space and the containing exterior space. The coordinates of the contained interior space and the coordinates of the containing exterior space are referenced by either the instructions prior to the transition and the instructions after the transition.

In some embodiments, the determining a path from a current location to the point of interest can include assessing if the current location and the point of interest are in a same walkable area and, when the current location and the point of interest are not in the same walkable area, locating at least one connection between the walkable area of the current location and the walkable area of the point of interest.

In some embodiments, when the point of interest is in a walkable area adjacent to the walkable area of the current location, the connection can connect the walkable area of the current location and the walkable area of the point of interest.

In some embodiments, the current location can correspond to the contained interior space, the point of interest can correspond to the containing exterior space, the coordinates of the contained interior space can be referenced by the instructions prior to the transition, and the coordinates of the containing exterior space can be referenced by the instructions after the transition.

In some embodiments, the current location can correspond to the containing exterior space, the point of interest can correspond to the contained interior space, the coordinates of the contained interior space can be referenced by the instructions after to the transition, and the coordinates of the containing exterior space can be referenced by the instructions before the transition.

In some embodiments, the coordinate transformation can include an affine transformation.

In some embodiments, the affine transformation can include at least one of rotation, scaling and translation of coordinates.

In some embodiments, the instructions to navigate the user device along the path can include a second portion of the indoor map.

In some embodiments, the walkable areas are areas within which a person can travel unimpeded.

In some embodiments, the indoor map and navigation instructions can be provided on a display screen of the user device.

In some embodiments, the indoor map is one of a two-dimensional map or a three-dimensional map.

According another broad aspect, a device for providing navigation instructions within an indoor facility is described herein. The device includes a communication interface for receiving and transmitting indoor maps from a communication network; one or more user interfaces for receiving user input and providing indication to the user; a memory; and a processor operatively coupled to the memory, the one or more user interfaces, and the communication interface. The processor is configured for receiving a first portion of an indoor map of an indoor facility containing a current location of the device; receiving a point of interest in the indoor map at a user interface; determining a path from the current location to the point of interest; and providing instructions to navigate the device along the path from the current location to the point of interest. The indoor map has a containing exterior space, a contained interior space within the containing exterior space, and a linkage. The linkage has a reference to the containing exterior space, a reference to the contained interior space, and a coordinate transformation to project coordinates of the contained interior space onto coordinates of the containing exterior space. The current location and the point of interest are in walkable areas. One of the current location and the point of interest corresponds to the contained interior space. The path includes a transition between the contained interior space and the containing exterior space. The coordinates of the contained interior space and the coordinates of the containing exterior space are referenced by either the instructions prior to the transition and the instructions after the transition.

According to another broad aspect, a system for providing navigation instructions within an indoor facility is described herein. The system includes a communication network and a wayfinding server. The wayfinding server includes a wayfinding storage unit for storing indoor maps of indoor facilities, a wayfinding communication interface for communicating with a plurality of user devices, and a wayfinding processor. The indoor maps include at least one tenant map and at least one facility map. Each tenant map is linked to a facility map. Each facility map relates to a containing exterior space. Each tenant map relates to a contained interior space that is within the containing exterior space of the facility map that the tenant map is linked to. The wayfinding processor is operatively coupled to the wayfinding storage unit and configured for receiving a facility map from a manager user device; storing the facility map in the wayfinding storage unit; receiving a tenant map from a tenant user device, the tenant map being linked to the facility map; storing the tenant map in the wayfinding storage unit; receiving a current location of a visitor user device; identifying an indoor map of an indoor facility containing the current location; transmitting a first portion of the indoor map of the indoor facility containing the current location to the visitor user device; receiving a point of interest in the indoor map from a visitor user device; determining a path from the current location to the point of interest; and transmitting instructions to navigate the visitor user device along the path from the current location to the point of interest. The indoor map includes the facility map, the tenant map, and a linkage. The linkage has a reference to the containing exterior space of the facility map, a reference to the contained interior space of the tenant map, and a coordinate transformation to project coordinates of the contained interior space of the tenant map onto coordinates of the containing exterior space of the facility map. The current location and the point of interest are in walkable areas. One of the current location and the point of interest corresponds to the contained interior space of the tenant map. The path includes a transition between the contained interior space of the tenant map and the containing exterior space of the facility map. The coordinates of the contained interior space of the tenant map and the coordinates of the containing exterior space of the facility map are referenced by either the instructions prior to the transition and the instructions after the transition.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
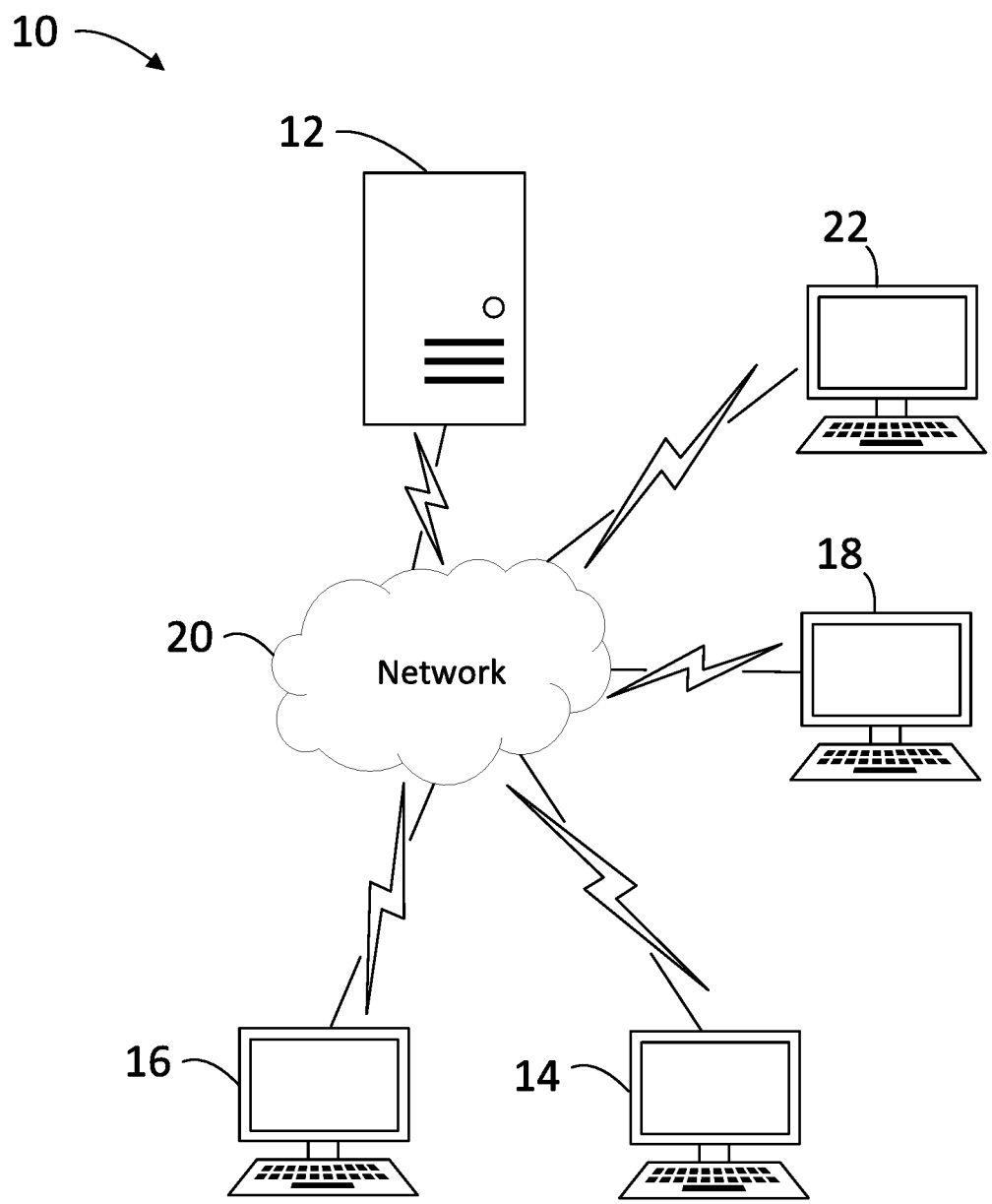
FIG. 1 is a diagram of a wayfinding system, in accordance with an embodiment.

FIG. 1 shows a block diagram illustrating a wayfinding system 10 for creating maps of a facility, in accordance with an embodiment. The wayfinding system 10 is for a facility including multiple facility units, i.e., a facility wayfinding system. The wayfinding system 10 is not restricted to a single facility, but may be extended to multiple facilities of the same type and/or different types, each including multiple facility units.

The wayfinding system 10 allows users, e.g., visitors to the facility, to orient themselves and to navigate from place to place within the facility, enabling them to find what they are looking for and to discover things around them. For example, a shopper at a mall can use the wayfinding system 10 to search for a particular store or a particular item or class of items (e.g., shoes), navigate to the relevant location, and/or look at the current promotions.

The facility may be any type of facility. Typically, the facility is a commercial facility or an institutional facility. For example, the facility may be a retail facility, e.g., a mall or a shopping center, an office facility, e.g., an office building, an event facility, e.g., a conference center, an amusement park, or a theme park, a transportation facility, e.g., an airport, or a bus terminal, an educational facility, e.g., a school or a university campus, or a medical facility, e.g., a hospital. The facility may be an indoor or an outdoor facility. However, the wayfinding system is particularly useful for indoor facilities.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

The wayfinding system 10 may include a facility wayfinding system, such as those described in United States Patent Application Publication Number 2014/0156186, application Ser. No. 13/852,404, which is hereby incorporated by reference in its entirety.

The wayfinding system 10 includes a server platform 12 which communicates with a plurality of store devices 14, a plurality of facility devices 16, and a plurality of administrator devices 18 via a communication network 20. The server platform 12 also communicates with a plurality of visitor devices 22. The server platform 12 may be a purpose built machine designed specifically for implementing a system and method for creating maps of a facility.

The server platform 12, store devices 14, facility devices 16, administrator devices 18 and visitor devices 22 may be a server computer, desktop computer, notebook computer, tablet, PDA, smartphone, or another computing device. The devices 12, 14, 16, 18, and 22 may include a connection with the communication network 20 such as a wired or wireless connection to the Internet. In some cases, the communication network 20 may include other types of computer or telecommunication networks. The devices 12, 14, 16, 18, and 22 may include one or more of a memory, a secondary storage device, a storage unit, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage.

The processor of each of devices 12, 14, 16, 18, and 22 may execute applications, computer readable instructions or programs. The applications, computer readable instructions or programs may be stored in memory or in secondary storage, or may be received from the Internet or other communication network 20. Input device may include any device for entering information into device 12, 14, 16, 18, and 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, and 22 may include multiple of any one or more of processors, applications, software modules, second storage devices, network connections, input devices, output devices, and display devices.

Although devices 12, 14, 16, 18, and 22 are described with various components, one skilled in the art will appreciate that the devices 12, 14, 16, 18, and 22 may in some cases contain fewer, additional or different components. In addition, although aspects of an implementation of the devices 12, 14, 16, 18, and 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the devices 12, 14, 16, 18, and 22 and/or processor to perform a particular method.

In the description that follows, devices such as server platform 12, store devices 14, facility devices 16, administrator devices 18, and visitor devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 14, 16, 18, 22 may send information to and receive information from the server platform 12. For example, a store user using the store device 14 may manipulate one or more input devices (e.g. a mouse and a keyboard) to interact with a user interface displayed on a display of the store device 14 to respond to questions. Generally, the device may receive a user interface from the communication network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of store devices 14, facility devices 16, administrator devices 18, and visitor devices 22. The store devices 14, facility devices 16, administrator devices 18, and visitor devices 22 are herein referred to as user devices. Generally, the information may comprise at least an identifier identifying the user who may be associated with a store, associated with a facility, an administrator of the system, or a visitor of the store or facility. For example, the information may comprise one or more of a username, e-mail address, password, or social media handle.

In response to receiving information, the server platform 12 may store the information in storage database. The storage may correspond with secondary storage of the device 12, 14, 16, 18, and 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a communication network 20 for example. In some cases, storage database may comprise one or more storage devices located at a networked cloud storage provider.

The store device 14 may be associated with a store account. Similarly, the facility device 16 may be associated with a facility account, the administrator device 18 may be associated with an administrator account, and the visitor device 22 may be associated with a visitor account. Store devices 14 and store accounts can be referred to as tenant devices and tenant accounts respectively as they relate to parties who occupy space within any time of facility. Facility devices 16, administrator devices 18, and facility and administer accounts can be referred to as manager devices and manager accounts as they are used by parties who are responsible for the management and administration of the facility.

Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

The devices 14, 16, 18, and 22 and the server platform 12 may communicate asynchronously, for example, by using an implementation of the WebSocket protocol, such as Socket.IO. Updates may be sent from the server platform 12 to each of the devices 14, 16, 18, and 22 in real time as interrupts, i.e., without polling. Likewise, user interaction data may be sent from each of the devices 14, 16, 18, and 22 to the server platform 12 in real time as interrupts, i.e., without polling.

Figure 2:
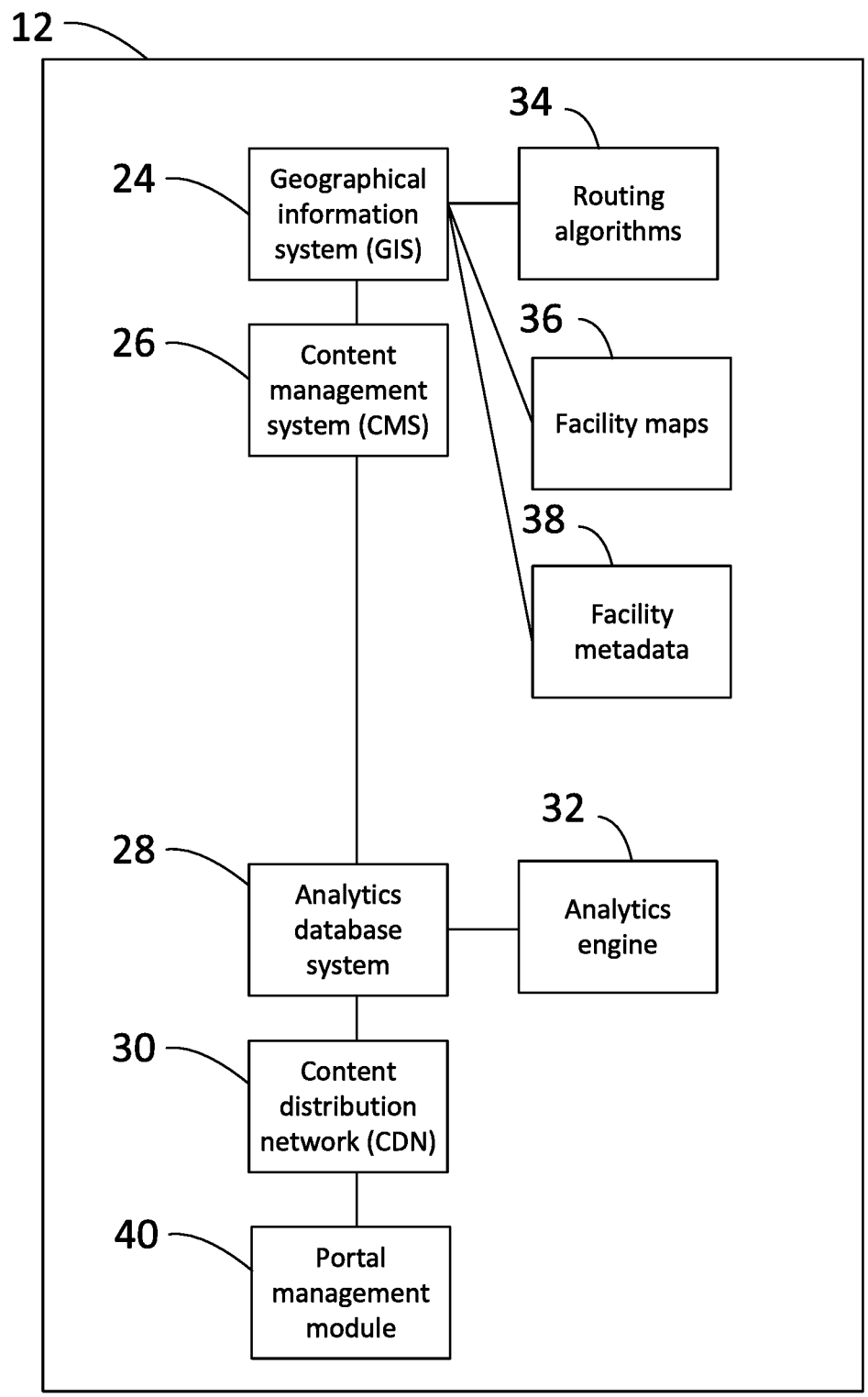
FIG. 2 is block diagram of a server platform of the wayfinding system of FIG. 1.

Turning now to FIG. 2, illustrated therein is the server platform 12, in accordance with an embodiment. The server platform 12 includes a content management system (CMS) 26, an analytics database system 28, and a geographical information system (GIS) 24. The server platform 12 may include multiple backend devices, e.g., servers. The server platform 12 may include at least a database server and a hosting server. In some instances, the server platform 12 also includes a content distribution network (CDN) 30. The CMS 26 and the analytics database system 28 may be hosted by the server platform 12. The GIS 24 may be hosted internally by the server platform 12 or supplied externally.

In some embodiments, the CMS 26 may be a frontend interface application, typically, implemented as a web service. CMS 26 may communicate with GIS 24, which then modifies the database. In this case, GIS 24 may be an Application Program Interface (API) which manipulates the database.

In some embodiments, CMS 26 stores content, including information relating to the facility and the facility units, handles updates to the content received from the devices 14, 16, 18, and 22, and provides content to the devices 14, 16, 18, and 22. For example, the CMS 26 may be a no structured query language (NoSQL) database application. The content stored in the CMS 26 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 38 stored in the GIS 24. This allows larger, less frequently accessed files to be stored in the CMS 26, rather than the GIS 24.

In some embodiments, the analytics database system 28 includes or is operatively connected to an analytics engine 32. The analytics database system 28 may be a database application, typically implemented as a web service. The analytics database system 28 stores all user interactions, e.g., user selections or "hits", searches, dates, types of mobile device, and/or movement patterns represented as heat maps, in real time, and generates analytics relating to the user interactions. Advantageously, because user interactions are recorded for several different devices 14, 16, 18, and 22, a relatively large sample size is obtained. The large sample size may allow analytics engine 32 to plot heat maps that are useful for users and to provide suggestions to improve user experience.

The GIS 24 is, typically, a representational state transfer (REST)-ful application programming interface (API). The GIS 24 includes routing algorithms 34, facility maps 36, and associated facility metadata 38. The GIS 24 may store the facility maps 36 and the facility metadata 38, handles updates to the facility maps 36 and the facility metadata 38, and provides the facility maps 36 and the facility metadata 38 to the devices 14, 16, 18, and 22. Typically, the GIS 24 serves the facility maps 36, e.g., as PNG files, and the facility metadata 38, e.g., as JSON/XML files, over the web. The facility metadata 38 is customizable for the type of facility, and may include digital representations of paths, polygons encapsulating facility units, nodes corresponding to facility locations, identifiers for each facility unit, and qualitative metadata, such as the type of path, e.g., hallway or dirt trail.

The GIS 24 also uses the routing algorithms 34 to calculate routes and provides the routes to the devices 14, 16, 18, and 22. Typically, the routing calculations output a JSON/XML list of node or polygon identifiers representing a complete path, which the devices 14, 16, 18, and 22 will interpret and display. The output may also include points of interest and other metadata 38, such as total estimated travel time based on type of path and real-time traffic, as described herein.

The visitor devices 22 may be efficiently managed and run both online and offline. The visitor devices 22 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 22 may be configured to provide a smooth, intelligent personal indoor mapping experience. Visitors can access directions and venue information from anywhere in the venue. Alternatively or additionally, visitors can plan routes prior to arriving and contact a location by phone or via social media directly from their personalized profile.

The server platform 12 may include a portal management module 40 for managing the wayfinding system 10. The store device 14, the facility device 16, and the administrator device 18 communicate with the portal management module 40 to create and modify facility related data.

With portal management module 40, all building data may be generated or modified using one tool via a web browser. The portal management module 40 may include collaborative tools with secure user accounts and permissions. In some embodiments, each user may be assigned a role with appropriate security credentials, such as an administrator (administrator device 18), a facility manager (facility device 16), and a store manager (store device 14). The administrator device 18 may have higher security clearance in terms of accessing and updating data, and modifying settings. The facility device 16 may be configured to change venue and store descriptions, logos and so on, but may not have permission to alter maps. etc. The store device 14 can modify or alter data relating to the store account that it is associated with. Additional rules may be enforced if desired. For example, users of store devices may only access and/or change certain data pertaining to certain stores, and so on.

For example, a venue editor may log into portal 40, make edits to a map 36 and save the map 36 at different stages. The unfinished map 36 may be saved in draft mode, where the venue editor may not have permission to publish the updated map until approved by administrator or facility owner from the administrator device 18 or the facility device 16, and the wayfinding system 10 may be configured to track approvals.

An indoor map may include a walkable area. For example, a walkable area can be a traversable area that a person can travel unimpeded.

Figure 3:
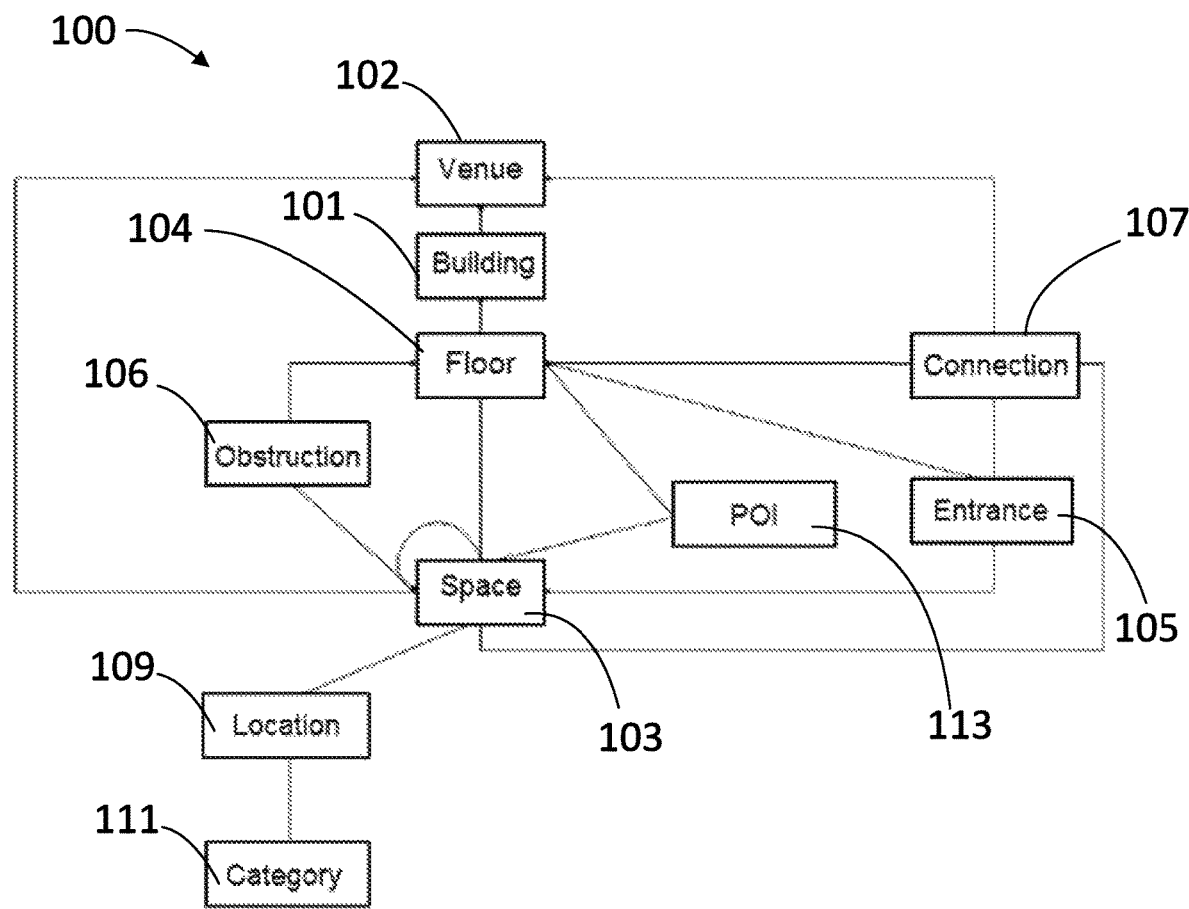
FIG. 3 is an example of a data system for indoor mapping data, in accordance with an embodiment.

Referring to FIG. 3, there is provided an example of a data system 100 for indoor mapping data. The data system 100 can include a venue 102, building 101, floor 104, obstruction 106, space 103, point of interest (POI) 113, connection 107, entrance 105, location 109, and category 111.

A venue 102 can be a traversable place, such as a mall, retail store, stadium, airport, campus, etc. Venues 102 can be represented by a polygon geometry. In the data system, the following variables can be associated with a venue 102: identifier or "id", type (possible values are "mall", "retail", "office"), name, logo, picture, address, website, telephone, email, social media (Facebook™, Twitter™, Instagram™), hours (opening hours), etc.

In the data system, a building 101 can be a collection of one or more floors 104 assembled into a structure within a venue 102, such as an office tower A. A venue 102 can include one or more multiple buildings. Furthermore, a building 101 can be a collection of floors 104 assembled into a structure within a venue 102, such as an office tower or a theatre. A building 101 can be represented by a null geometry. For example, the footprint of the building can be level 0 of the floor. In the data system, the following variables can be associated with a building 101: identifier or "id", venue (the venue that this building is contained within), name, logo, picture, address, website, telephone, email, social media (Facebook™, Twitter™, Instagram™), hours (opening hours), etc.

For example, a structural geometry can be any geometry which supports and is essential to the venue's physical assembly.

A floor 104 can be a traversable level within a building 101. A floor 104 can be a traversable level within a building 101. Floors 104 can be represented by a polygon geometry. Floors 104 can be limited to the bounds of their containing venue 102. In the data system, the following variables can be associated with a floor 104: identifier or "id", building (the building that this floor is contained within), abbreviation, level (possible values are 0 (ground level), −n (for underground level n) and +n (for above ground level n)), name, logo, picture, address, website, telephone, email, social media (Facebook™ Twitter™, Instagram™), hours (opening hours), etc.

A space 103 can be a traversable area such as a room. Spaces 103 can be represented by a polygon geometry. Spaces 103 may not intersect other spaces and may not extend beyond their containing space. In the data system, the following variables can be associated with a space 103: identifier or "id", parent (the venue, floor, or space that this space is contained within), passthrough (used to avoid cutting through a space during navigation—set to true if the space can be used by pedestrians as a pass through waypoint, false otherwise), name, logo, picture, address, website, telephone, email, social media (Facebook™, Twitter™, Instagram™), hours (opening hours), etc.

An obstruction 106 is a non-traversable area, such as a partition wall. For example, obstructions 106 can be represented by a Polygon geometry. For example, obstructions 106 may intersect with interior spaces. For example, obstructions 106 may not extend beyond the containing space. In the data system, the following variables can be associated with an obstruction 106: identifier or "id", parent (the space or floor that the obstruction is contained within), type (possible values are "art", "column", "decor", "earth", "fountain", "furniture", "kiosk", "wall", "water", etc.), name, picture, etc.

An entrance 105 can be a mechanism that facilitates traversal into a space 103 (such as a door). For example, an entrance 105 can also be a mechanism that facilitates traversal into a connection 107 or a floor 104. For example, entrances 105 can be represented by a LineString geometry or Point geometry.

Entrances 105 may be incident to the edges bounding their containing space 103, connection 107, or floor 104. For example, entrances 105 may not intersect one another. In the data system, the following variables can be associated with an entrance 105: identifier or "id", parent (space, connection, or floor that the entrance conveys to), type (possible values are "opening", "door", "gate"), direction (possible values are "both", "enter", "exit", "none"), accessible (possible values are "yes", "no", "designated"), name, picture, hours, etc.

A connection 107 can be a mechanism that facilitates traversal between spaces 103, such as a staircase or an elevator within a building. For example, connections 107 can be represented by a Polygon geometry or a Point geometry. For example, connections 107 may not intersect other traversable features and may not extend beyond their containing floor. In the data system, the following variables can be associated with a connection 107: identifier or "id", parent (the space or floor that the connection is contained within), destinations (connections that this connection connects to), type (possible values are "stairs", "elevator", "escalator", "moving-walkway", "ramp", "slide", etc.), name, logo, picture, hours, etc.

A location 109 can be a place of interest covering a space 103, such as a restaurant or meeting room. For example, a location 109 can be a place of interest covering a space 103, such as a store or meeting room. For example, locations 109 can be represented by a null geometry and can be instead realized through their linked space. In the data system, the following variables can be associated with a location 109: identifier or "id", spaces (spaces that the location covers), type (possible values are "store", "anchor", "department", "section", "room", "area", etc.), categories (the categories that this location is a member of), name, logo, picture, address, website, telephone, email, social media (Facebook™, Twitter™, Instagram™), hours (opening hours), etc.

A point of interest (POI) 113 can be affixed to a space 103, such as an ATM or a telephone. For example, a POI 113 can be represented by a point in space. For example, POIs 113 can be represented by Point geometry. For example, POIs 113 may not extend beyond their containing space. In the data system, the following variables can be associated with a POI 113: identifier or "id", parent (the space or floor that the POI is contained within), name, logo, picture, address, website, telephone, email, social media (Facebook™, Twitter™, Instagram™), hours (opening hours), etc.

A category 111 can be a group of locations 109 with shared characteristics, such as restaurants and/or meeting rooms. For example, categories 111 can be represented by a null geometry. For example, categories 111 can be represented by their associated locations 109. In the data system, the following variables can be associated with a category: identifier or "id", name, logo, picture, etc.

An indoor map may include a data system including venues 102, buildings 101, floors 104, obstructions 106, spaces 103, POIs 113, connections 107, entrances 105, locations 106, and categories 111 as described above. For example, an indoor map may include a data system of a geometry of features (e.g., offices, elevators, stores, malls, restaurants, washrooms, stairwells, exit doors, etc.) These may be referred to as points of interest. The points of interest may be indicated by a list of objects, such as polygons, for example, indicating one or more of location, size, name, tenant information, etc.

The indoor mapping data may be defined recursively as "walkable areas". The walkable areas can be called spaces 103. Each of these walkable areas may be a complete floorplan (e.g. with walls, entrances, furniture, amenities, etc.). Each walkable area may contain data associated with amenities, stores, elevators, malls, restaurants, washrooms, stairwells, exit doors, obstructions, entrances, furniture, etc. Furthermore, walkable areas may be nested within each other to form an entire floorplan.

Indoor mapping data, such as walkable areas may be linked or nested with a linkage object. The linkage object is a data structure containing: a reference to the containing exterior space, a reference to the contained interior space, and a coordinate transformation to project the contained space onto the containing space. By nesting indoor mapping data, the indoor mapping data is organized in layers. Walkable areas may be organized in layers. A walkable area may contain another walkable area. For example, a walkable area may contain an array of walkable areas.

For example, an exterior space "A" can be a 10 by 10 unit box facing north with a 1:1 scale centered at (0, 0), and an interior space "B" can be a 2 by 2 unit box facing south with 2:1 scale centered at (0, 0). A linkage object can be created to position the interior space "B" within exterior space "A", and in particular, in the bottom-right corner, upright, and to scale having exterior_space_id="A", interior_space_id="B", and transform=Affine[rotation=-π scale=0.5, x_translation=+4, y_translation=-4] where positive-Y is "north" and positive-X is "east".]

Figure 4A:
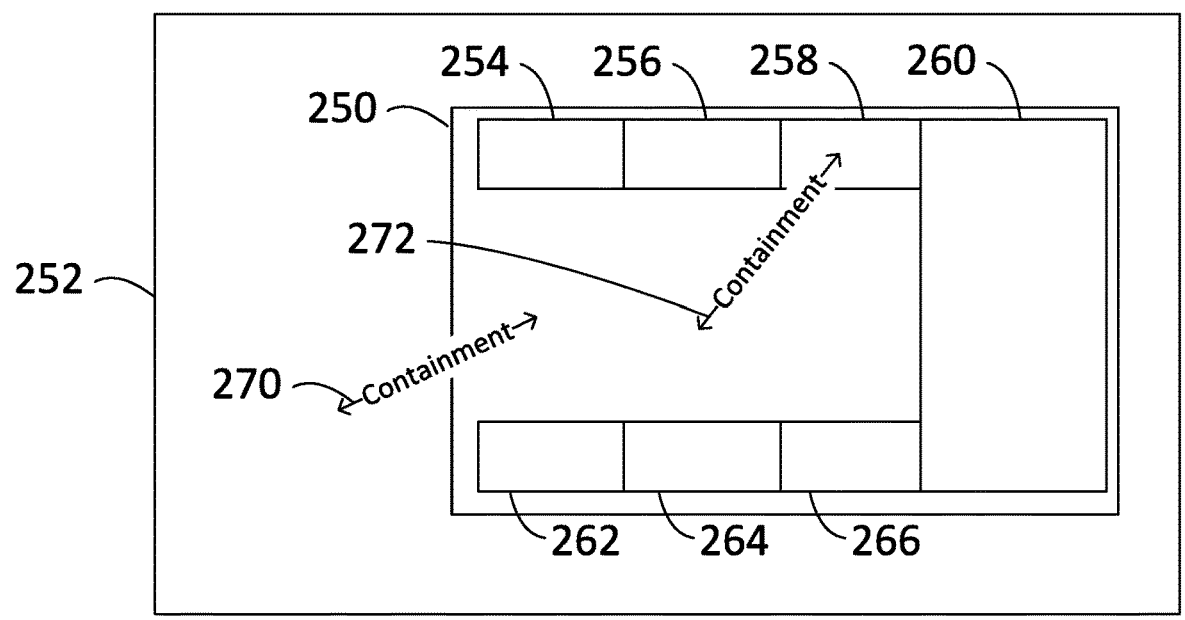
FIG. 4A is a block diagram of a floorplan, in accordance with an embodiment.

With reference to FIG. 4A, an intermediate section (e.g., a "Fashion Court") 250, could be contained via linkage object 270 within the building (e.g., a "Mall") 252 and then the units (e.g., "Retail Stores") 254, 256, 258, 260, 262, 264, and 266 could be contained via linkages 272 within the intermediate section ("Fashion Court") 250. The nesting represents the physical containment of the floor plans (e.g. of a "Retail Store" contained within a "Mall"). For example, the nesting can be arbitrary insofar as there are no mandatory shapes. For example, it is not required that all "Retail Stores" be represented, in their entirety as a single space that is directly contained within a single "Mall".

Figure 4B:
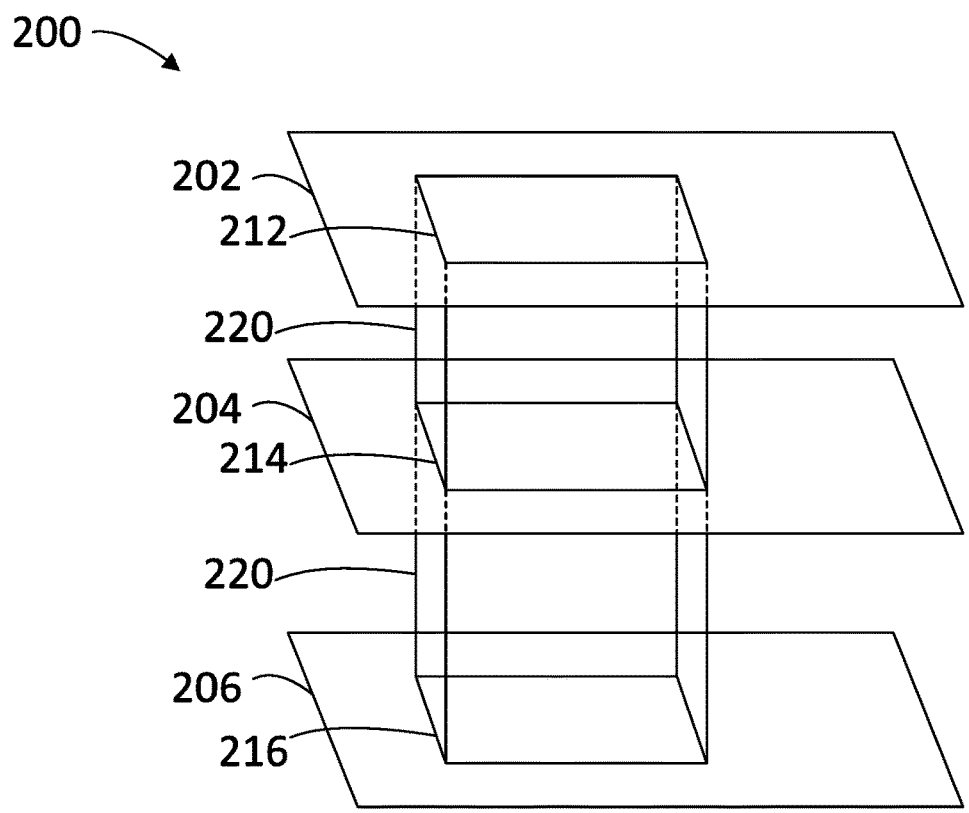
FIG. 4B is a block diagram of a building, in accordance with an embodiment.

FIG. 4B illustrates an example floorplan for a building 200, in accordance with an embodiment of the wayfinding system 10. The building 200 includes three floorplans 202, 204, and 206. The building 200 is represented as concurrent floorplans, one floorplan for each level 202, 204, and 206. Each floor 202, 204, 206 of building 200 may include units or rooms 212, 214, and 216 defined as walkable areas. The rooms 212, 214, and 216 may be nested 220 within each other to form a complete floorplan of building 200. For example, walkable area 212 may be nested within walkable area 214, and walkable area 214 may be nested within walkable area 216. The floorplans nest only along the flat "floor" plane.

Further, walkable area 214 may contain data associated with amenities, stores, elevators, malls, restaurants, washrooms, stairwells, exit doors, obstructions, entrances, and furniture located on floorplan 202. Thus, by knowing walkable area 214, a complete floorplan of building 200 is known as walkable area 214 and walkable area 216 are nested within walkable area 212. For example, this data system allows the server platform 12 and the user device 22 to use a reduced amount of data, which allows for faster processing or transfer of files, particularly images which can be large.

The nested indoor mapping data 212, 214, and 216 for building 200 allows the model for individual floorplans to be simple and flat, while adding complexity through the linkage 220 that binds the floorplans 202, 204, and 206 together. The nested indoor mapping data 212, 214, and 216 may allow for the implementation of features that operate on the composition of simple floorplans 202, 204, and 206 rather than as components of a larger, indivisible structure, such as building 200.

Figure 5:
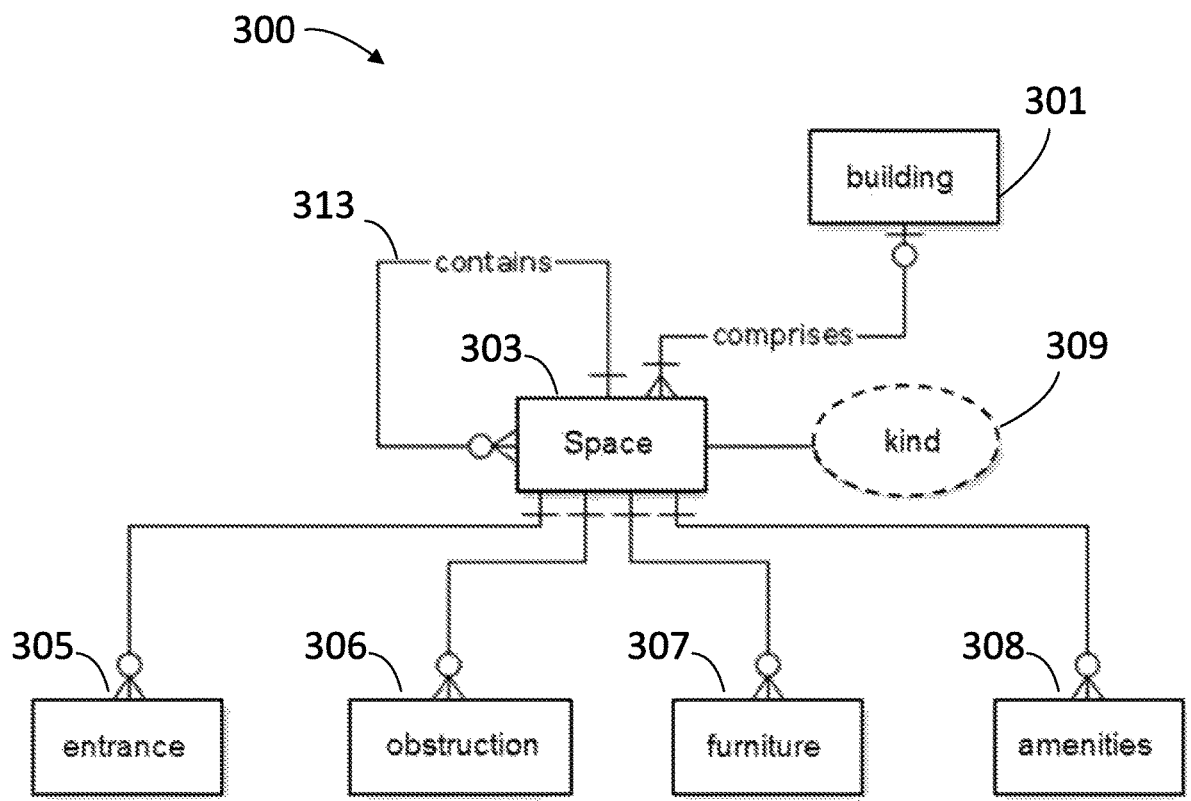
FIG. 5 is an example of a data system for indoor mapping data, in accordance with an embodiment.

Referring now to FIG. 5, illustrated therein is a data system 300 for indoor mapping data, in accordance with an embodiment. The data system 300 may be stored on a backend system such as the server platform 12 of FIG. 1. The data system 300 includes building data 301. Building data 301 includes a space layer 303. The space layer 303 represents a real world area that is walkable by a user.

The space layer 303 includes a number of attributes such as entrance data 305, obstruction data 306, furniture data 307 and amenities data 308. The space layer 303 includes kind data 309. The space layer 303 also includes space data 313. Space data 313 is nested in a space layer 303. The nested space data 313 has its own set of attributes such as entrances 105, obstructions 106, furniture and amenities (not shown).

Figure 6:
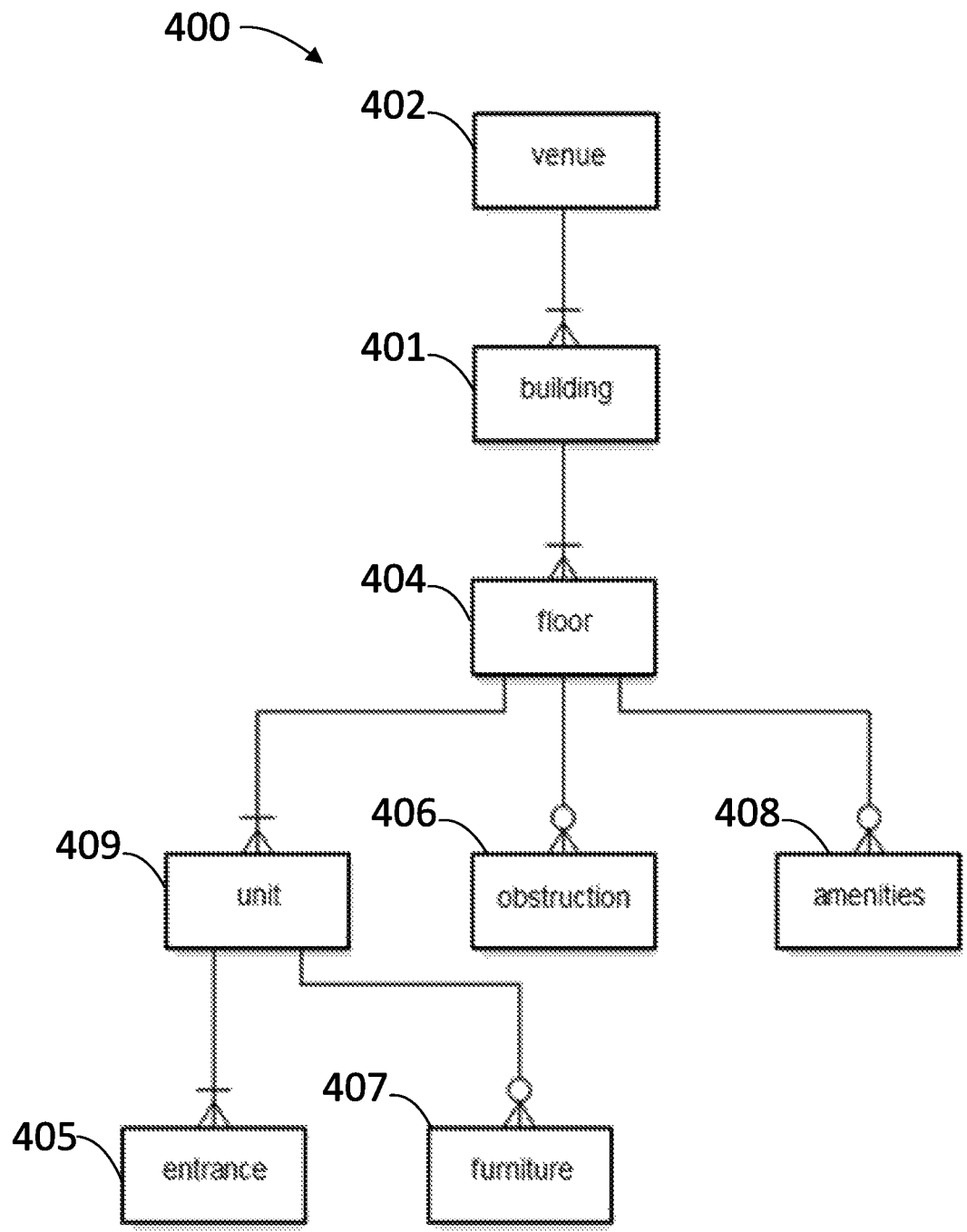
FIG. 6 is a conventional data system for indoor mapping data.

Referring now to FIG. 6, illustrated therein is a conventional data system 400 for indoor mapping data. The conventional system 400 may not be known in the art and is not admitted prior art. The conventional data system 400 is a system in that it has a fixed hierarchy. The system 400 includes building data 401, which is a subset of the venue data 402. The floor data 404 is a direct subset of the building data 401. Obstruction data 406, amenity data 408, and unit data are direct subsets of the floor data 404. Entrance data 405 and furniture data 407 are direct subsets of the unit data 409.

Referring again to FIG. 5, in contrast to the conventional system 400, the data system 300 may permit implementing processes that operate on the composition of simple floorplans recursively. The data system 300 may restrict complexity to the process in ascending or descending the hierarchy of data rather than adding additional complexity to each space within the hierarchy. For example, determining whether a space 103 can be "walked through" for the purposes of indoor navigation is restricted to the knowledge of the immediate interior obstructions 106 and the immediate interior spaces whose low-resolution representation operate as obstructions 106.

Example 1: Fine-Grained Access Control

The system 300 may include user authorization controls for allowing access to a subset of the mapping data such as a specific floor. In the conventional system 400, data may have been partitioned at a venue level 402. Implementing the system 300 provides that the data may be partitioned in a manner that facilitates authorization queries at both the venue level 301 and at the floor level 303.

The nested system 300 partitions data intrinsically at the space layer 303. The user authorization controls may include two implementation groups: features that operate on the space layers 303 themselves, which are not hierarchical, and features that operate on the linkage binding the spaces 303, 313 together, which is the hierarchy. Granting or denying permissions at specific and previously unused levels 303 is natural within the nested hierarchical system 300. Similarly, adding features to affect how permissions cascade or bubble through the hierarchy are separate from how they operate when resolved at a specific level in the hierarchy.

Example 2: Composition of Data Sets

The system 300 may provide existing data at a higher level of detail (such as a store/unit) that is transferrable to new data at a lower level of detail (such as a mall/building).

In the conventional system 400, the store is modeled as a degenerate venue 402 having a venue 402, building 401, and floor 404 that is identical and not representative of a real-world venue, building or floor in order for the representation of the store to fit within a rigid model. The unit 409 that the store occupied within the venue data 402 is identical and the levels of detail and data ownership are incompatible. For the system 400, there are two options for merging the store with the venue. The data from the store may be flattened into the map which may violate data ownership and authorization constraints. The data may be kept separate, which may add complexity to the system 400 to allow for this special case of nesting a degenerate venue (the store) within a normal one (the venue).

The nested hierarchical system 300 allows for a venue and a store to be modelled separately. The separate modeling may provide retention of ownership and authorization constraints. The nested hierarchical system 300 may remove the degenerate venue, building and floor structures and instead model the store as a plan of a specific space 303. It is then possible to nest the unit (store) within the venue (mall), using only the bounds of the unit (store) space as the "unit" within the venue (mall) map, and then the details within the bounds as the artefacts within the unit (store) map.

Example 3: Replacement of Components

The system 300 may provide the ability to swap in and out complete but different floorplans for a particular unit. The swapping of floorplans may be used in the set up and maintenance of a retail project. The floorplans may include seasonal layouts, special event sections, and long-lived layout plans.

In the conventional system 400, the floorplans may be swapped by copying venues with building tools. This coarse granularity may inhibit users from manipulating only subsets of data without impacting the venue as a whole, by causing data loss, among other consistency issues. Data loss may result from changes that are missing when the venue is copied. While the conventional system may have a "copy-on-write" mechanism, however the copy produced by the "copy-on-write" mechanism may be out of date lest the granularity of the copy be at the entity-attribute level.

The system 300 may provide dynamic mounting and unmounting of interior spaces 303 dynamically. The system 300 may not add complexity to the floorplans themselves as the system is an operation over the linkage that binds the floorplans together. As the interior space 303 may be arbitrary, any region can be "promoted" into a space 303 and made eligible for swap/exchange within a different space 303. System 300 users may compose spaces 303 in a manner that satisfies their building planning requirements. For example, the venue may be a convention center that has different but recurring layouts that cover an area that is swapped in and out periodically.

Example 4: Levels of Detail

The system 300 may allow maps to be displayed in varying levels of detail. For example, the system 300 may display a geographic region such as a campus as a whole, and a specific area within a building in the geographic region such as a campus building. The system 300 may display the geographic region and building within the region without duplicating or losing the low-resolution representation of the surrounding areas within the building or indeed the geographic region itself.

In the conventional system 400, the degenerate venue 402 containing the area is duplicated to also include the floor 404. The conventional system 400 may also display a low-resolution representation of the geographic region itself, adding further duplication. The conventional system 400 may have a maintenance burden by having to ensure that the low-resolution duplication within the degenerate venue is consistent with the normal venue representing the geographic region (campus).

The system 300 may represent the level of detail naturally. The system 300 illustrates only the bounds of spaces 303 that are not part of the level of focus. The system 300 may also keep the data normalized so that changes made to the geographic region (campus venue) are observed by the low-resolution representations shown adjacent the area of focus. In addition, the system 300 may re-use existing graph-based processes for querying, traversing, and wayfinding the geographic region data rather than approximating the data on multiple flat data structures.

In an embodiment, the data system 300 is provided in the wayfinding system 10 of FIG. 1. The maps of walkable areas (i.e. spaces) are formatted and are nested within each other. The user device may include an application that displays maps of walkable areas and receives and processes user selections. The selections may be based on a group of criteria including, but not limited to, the location of the user device, a desired destination, and points of interest, etc. The map may be a two-dimensional map or a three-dimensional map.

The user device may request a point of interest or desired destination to the user. As a user is searching for a point of interest, the system may arbitrarily load a walkable area associated with the building in question.

As the wayfinding system 10 determines possible walkable areas associated with the selected point of interest, new levels of narrower content are created and to the user device, until one or more points of interest are reached by the user device. The data system 300 may reduce the amount of data transferred between the user device and the server platform 12 over the communication network 20, which may allow for faster transfer of data.

The user device, may display a walkable area containing a point of interest. The walkable area of interest may contain one or more points of interest. The different levels of walkable areas may be unpacked (or unnested) as the wayfinding system 10 determines the walkable areas of interest associated with the one or more points of interest from a narrowest level data system map to a broadest level data system map. The various maps of walkable areas may be stored in a map file for faster processing on the user device. The user device may choose and retrieve the most appropriate walkable area from the indoor map to display. For example, the walkable areas of interest may be displayed in the indoor map.

The map generation may take place on the server platform 12, in which the user device provides search input to the server platform 12. A reduced set of information from the data system 300 is used to generate the map at a higher level that is less dense with data. The process of reducing complexity and data content (i.e., nesting and unnesting at the data system 300) may be repeated automatically at the server platform 12 until only the walkable area of interest or the point of interest is found, or the user device provides additional input to change or refine the map results. The importance of a point of interest may be measured with a score that depends on search key words received by the user device.

The group of walkable areas (or spaces) may be nested and unnested at multiple levels of detail according to points of interest search. The data system 300 may be integrated into a map file that may be accessed by the user device. The map file may be stored remotely at the server platform 12, or one or more maps may be transmitted for storage on the user device.

The wayfinding system 10 may use the nested hierarchical data system 300 to generate indoor navigation data. The indoor mapping data may be defined recursively as walkable areas (i.e. spaces). Each walkable area is a floorplan with walls, entrances, furniture, amenities, etc. Each walkable area may contain data associated with amenities, stores, elevators, malls, restaurants, washrooms, stairwells, exit doors, obstructions, entrances, furniture, etc. Walkable areas may be nested within each other to form a complete floorplan of the indoor environment. Walkable areas may be connected together by user access rights or privilege, manager preferences, etc.

The indoor mapping data may also contain the geometry of the indoor environment. The data system 300 may include all geometric details for features of all possible points of interests, such as a mall, department store, office building, etc. The data system may be stored as a file on the server platform.

In order to reduce data storage, data transfer, and processing demand on the user device, a walkable area map, from which any indoor map may be constructed, may be stored on the server platform 12. Depending on the processing capability and power storage capacity of the server platform 12, the walkable area map, or parts of it, may be downloaded to and maintained on the user device. As walkable areas are glued together, each time indoor navigation from a first walkable area is transferred to a second walkable area, the second walkable area may be downloaded to and maintained on the user device.

The user device may receive input from a user about one or more points of interest. For example, the user device may receive a search for all perfume vendors in a shopping mall from a consumer. In another example, the user device may receive a search for all fire extinguisher and sprinkler shut-off control valve locations from a security officer.

The user device generates a list of points of interests that are transmitted to the server platform 12. The server platform 12 generates a reduced data map or a map of reduced complexity. For example, the server platform 12 generates a map of the immediate walkable area where the user device is located. In another example, the server platform 12 generates a map of a walkable area where the user has access may be generated. As walkable areas are glued together, the user device may unnest (or unpack) all possible walkable areas containing the points of interests.

For example, where the user device is located on the second floor of the mall, the user device may display only a map of all perfume vendors located on the second floor. The map of the second floor is a reduced map compared to the map of the entire mall. The map of the second floor may be constructed at the server platform 12, and transmitted to the user device using less bandwidth or transmission time. The user device may further receive a selection to display all perfume vendors located on the first floor as well. As walkable areas are glued together, the wayfinding system 10 automatically determines a map of the first floor of the mall and wayfinding navigation instructions. The map of the first floor may be constructed at the server platform 12, and transmitted to the user device at time it is required.

The user device may then receive directions to navigate from a current location to a point of interest. As the indoor mapping data is defined recursively as walkable areas, the user device first determines the current walkable area. If the point of interest is located in the current walkable area, the application provides navigation instructions to the point of interest without unnesting (or unpacking) other walkable areas.

However, if the point of interest is located in another walkable area, the user device determines the walkable area associated with the point of interest (i.e. the walkable area of interest). Then, in an iterative manner, the user device determines possible routes from the current walkable area and the walkable area of interest. For example, the user device examines adjacent or nested walkable areas connected to the current walkable area; if one of these walkable areas is the walkable area of interest, the iterative process stops there.

But, if these adjacent or nested walkable areas are not the walkable area of interest, the user device continues the iterative process by examining other walkable areas that are connected to these adjacent or nested walkable areas. Therefore, the iterative process continues until the user device finds the walkable area of interest.

For example, the user device may determine that the walkable area associated to the second floor of a mall is connected to the walkable area associated to the fourth floor. For example, the second floor may be connected to the fourth floor by elevators or stairs. Once the walkable area of interest is found, the user device generates navigation instructions from the current location to the point of interest. Navigation instructions from the current location to the point of interest may be constructed at the server platform 12, and transmitted to the user device.

Figure 7:
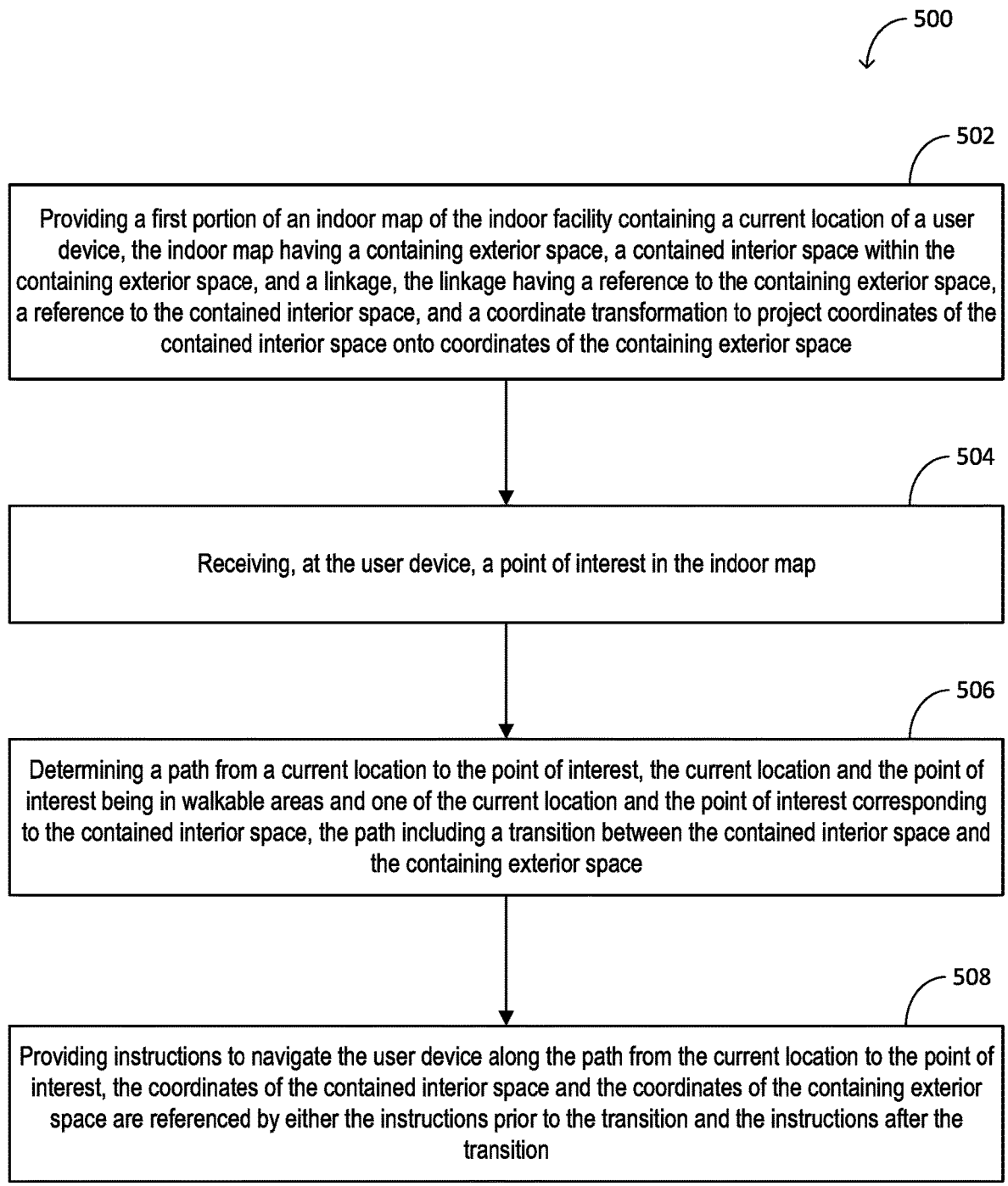
FIG. 7 is a flowchart of an example embodiment of various methods of providing instructions on a mobile device to navigate an indoor facility.

Referring now to FIG. 7, shown therein is a flowchart of an example embodiment of various methods of providing instructions on a mobile device, that is a user device, to navigate an indoor facility. The method 500 can begin at step 502 by providing a first portion of an indoor map of the indoor facility containing a current location of a user device. The indoor map has a containing exterior space, a contained interior space within the containing exterior space, and a linkage. The linkage has a reference to the containing exterior space, a reference to the contained interior space, and a coordinate transformation to project coordinates of the contained interior space onto coordinates of the containing exterior space.

At step 504, the user device can receive a point of interest in the indoor map. The point of interest can be selected by the user of the user device.

Next, at step 506, the method involves determining a path from a current location to the point of interest. The current location and the point of interest are in walkable areas. One of the current location and the point of interest corresponds to the contained interior space. The path includes a transition between the contained interior space and the containing exterior space.

Finally, at step 508, the method involves providing instructions to navigate the user device along the path from the current location to the point of interest. The coordinates of the contained interior space and the coordinates of the containing exterior space are referenced by either the instructions prior to the transition and the instructions after the transition.

While the above description provides examples of one or more apparatus, methods, or systems, it will be appreciated that other apparatus, methods, or systems may be within the scope of the claims as interpreted by one of skill in the art.

The invention claimed is:

1. A method of providing navigation instructions within an indoor facility by a data system, the method comprising:
providing indoor map data to a user device, including a first portion of an indoor map of the indoor facility containing a current location of the user device, the indoor map having a containing exterior space, a contained interior space within the containing exterior space, and a linkage, wherein the linkage is a hierarchical data structure within the data system, the linkage having a reference to the containing exterior space, a reference to the contained interior space, and a coordinate transformation to project coordinates of the contained interior space onto coordinates of the containing exterior space, wherein the indoor map data of the first portion of the indoor map is hierarchically nested with the linkage in the data system and wherein the indoor map data is modelled and replaced at a level of the containing exterior space or the contained interior space to reduce an amount of data transferred from the data system to the user device;
receiving, from the user device, a point of interest in the indoor map;
determining a path from the current location to the point of interest, the current location and the point of interest being in walkable areas and one of the current location and the point of interest corresponding to the contained interior space, the path including a transition between the contained interior space and the containing exterior space; and
providing instructions to the user device to navigate along the path from the current location to the point of interest, whereby the coordinates of the contained interior space and the coordinates of the containing exterior space are referenced by either the instructions prior to the transition and the instructions after the transition.

2. The method of claim 1, wherein the determining a path from a current location to the point of interest comprises:
assessing if the current location and the point of interest are in a same walkable area; and
when the current location and the point of interest are not in the same walkable area, locating at least one connection between the walkable area of the current location and the walkable area of the point of interest.

3. The method of claim 1, wherein when the point of interest is in a walkable area adjacent to the walkable area of the current location, a connection connects the walkable area of the current location and the walkable area of the point of interest.

4. The method of claim 1, wherein:
the current location corresponds to the contained interior space;
the point of interest corresponds to the containing exterior space;
the coordinates of the contained interior space are referenced by the instructions prior to the transition; and
the coordinates of the containing exterior space are referenced by the instructions after the transition.

5. The method of claim 1, wherein:
the current location corresponds to the containing exterior space;
the point of interest corresponds to the contained interior space;
the coordinates of the containing exterior space are referenced by the instructions before the transition; and
the coordinates of the contained interior space are referenced by the instructions after to the transition.

6. The method of claim 1, wherein the coordinate transformation comprises an affine transformation.

7. The method of claim 6, wherein the affine transformation comprises at least one of rotation, scaling and translation of coordinates.

8. The method of claim 1, wherein the instructions to navigate the user device along the path comprise a second portion of the indoor map.

9. The method of claim 1, wherein the walkable areas are areas within which a person can travel.

10. The method of claim 1, wherein the indoor map and navigation instruction are provided on a display screen of the user device.

11. The method of claim 1, wherein the indoor map is one of a two-dimensional map or a three-dimensional map.

12. A wayfinding system for providing navigation instructions within an indoor facility by a data system, the wayfinding system comprising:
a communication network; and
a wayfinding server comprising:
a wayfinding storage unit for storing indoor map data of indoor maps of indoor facilities, the indoor maps comprising at least one tenant map and at least one facility map, each tenant map being linked to a facility map, each facility map relating to a containing exterior space, each tenant map relating to a contained interior space that is within the containing exterior space of the facility map that the tenant map is linked to;
a wayfinding communication interface for communicating with a plurality of user devices; and
a wayfinding processor operatively coupled to the wayfinding storage unit, the wayfinding processor being configured for:
receiving a facility map from a manager user device;

storing the facility map in the wayfinding storage unit;

receiving a tenant map from a tenant user device, the tenant map being linked to the facility map;

storing the tenant map in the wayfinding storage unit;

receiving a current location of a visitor user device;

identifying an indoor map of an indoor facility containing the current location, the indoor map including the facility map, the tenant map, and a linkage, wherein the linkage is a hierarchical data structure within the data system, the linkage having a reference to the containing exterior space of the facility map, a reference to the contained interior space of the tenant map, and a coordinate transformation to project coordinates of the contained interior space of the tenant map onto coordinates of the containing exterior space of the facility map, and wherein the indoor map data of the indoor map is hierarchically nested with the linkage in the data system and wherein the indoor map data is modelled and replaced at a level of the containing exterior space or the contained interior space to reduce an amount of data transferred from the data system to the visitor user device;

transmitting a first portion of the indoor map of the indoor facility containing the current location to the visitor user device;

receiving a point of interest in the indoor map from the visitor user device;

determining a path from the current location to the point of interest, the current location and the point of interest being in walkable areas and one of the current location and the point of interest corresponding to the contained interior space of the tenant map, the path including a transition between the contained interior space of the tenant map and the containing exterior space of the facility map; and transmitting instructions to the visitor user device to navigate along the path from the current location to the point of interest, whereby the coordinates of the contained interior space of the tenant map and the coordinates of the containing exterior space of the facility map are referenced by either the instructions prior to the transition and the instructions after the transition.

13. The wayfinding system of claim 12, wherein the determining a path from a current location to the point of interest comprises:

assessing if the current location and the point of interest are in a same walkable area; and when the current location and the point of interest are not in the same walkable area, locating at least one connection between the walkable area of the current location and the walkable area of the point of interest.

14. The wayfinding system of claim 12, wherein when the point of interest is in a walkable area adjacent to the walkable area of the current location, a connection connects the walkable area of the current location and the walkable area of the point of interest.

15. The wayfinding system of claim 12, wherein:

the current location corresponds to the contained interior space;

the point of interest corresponds to the containing exterior space;

the coordinates of the contained interior space are referenced by the instructions prior to the transition; and the coordinates of the containing exterior space are referenced by the instructions after the transition.

16. The wayfinding system of claim 12, wherein:

the current location corresponds to the containing exterior space;

the point of interest corresponds to the contained interior space;

the coordinates of the containing exterior space are referenced by the instructions before the transition; and the coordinates of the contained interior space are referenced by the instructions after to the transition.

17. The wayfinding system of claim 12, wherein the coordinate transformation comprises an affine transformation.

18. The wayfinding system of claim 17, wherein the affine transformation comprises at least one of rotation, scaling and translation of coordinates.

19. The wayfinding system of claim 12, wherein the instructions to navigate the visitor user device along the path comprise a second portion of the indoor map.

* * * * *